United States Patent [19]
Dungan

[11] Patent Number: 6,135,540
[45] Date of Patent: Oct. 24, 2000

[54] MATERIAL HANDLING TRAILER SYSTEM

[76] Inventor: Richard O. Dungan, 4714 E. Shangri La Rd., Phoenix, Ariz. 85028-3038

[21] Appl. No.: 09/484,298

[22] Filed: Jan. 18, 2000

Related U.S. Application Data

[62] Division of application No. 08/759,137, Dec. 2, 1996, Pat. No. 6,027,297.

[51] Int. Cl.⁷ .............................. B62D 25/00; B62D 35/00
[52] U.S. Cl. .................................... 296/180.4; 296/180.1; 296/50
[58] Field of Search ............................. 296/180.4, 180.1, 296/50, 181, 182

[56] References Cited

U.S. PATENT DOCUMENTS

| | | | |
|---|---|---|---|
| 2,169,076 | 8/1939 | Barton | 296/36 X |
| 2,184,814 | 12/1939 | Nagamatsu | 296/50 |
| 2,879,072 | 3/1959 | Rear et al. | 296/36 X |
| 4,790,589 | 12/1988 | Moore et al. | 296/50 |
| 5,029,927 | 7/1991 | Totani | 296/50 |
| 5,538,315 | 7/1996 | Dixon | 296/180.4 |

*Primary Examiner*—Joseph D. Pape
*Attorney, Agent, or Firm*—Gregory J. Nelson

[57] ABSTRACT

A multiple use trailer system for hauling conventional and long loads. The front and rear end gates are closed for normal loads and open to accommodate long loads such as rebar and lengths of pipe. The rear gate has an aerodynamic air wing that holds it in the open position. A dumping mechanism has a platform which is tiltable to dump the trailer and in one embodiment is mounted on a fulcrum which both pivots and moves laterally to maintain a constant dump line.

7 Claims, 8 Drawing Sheets

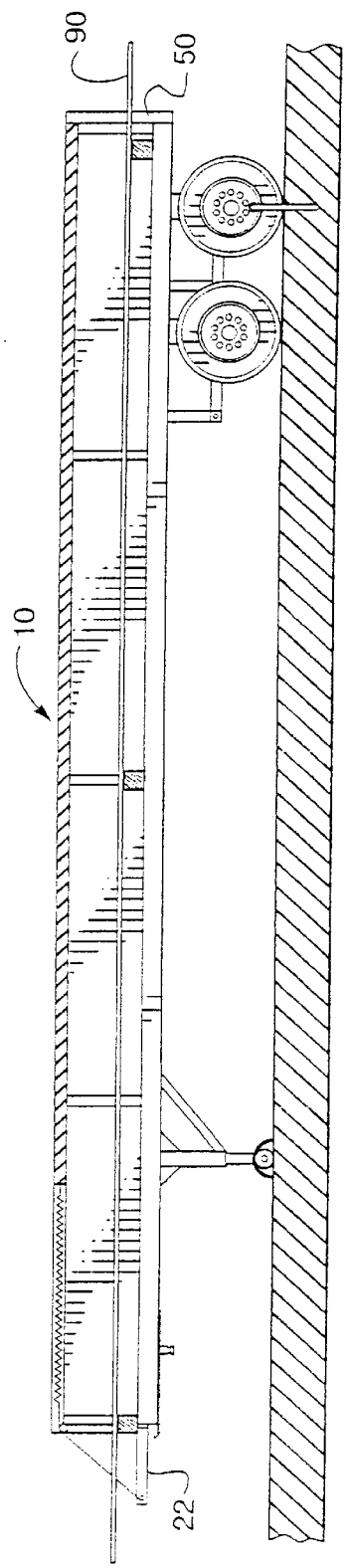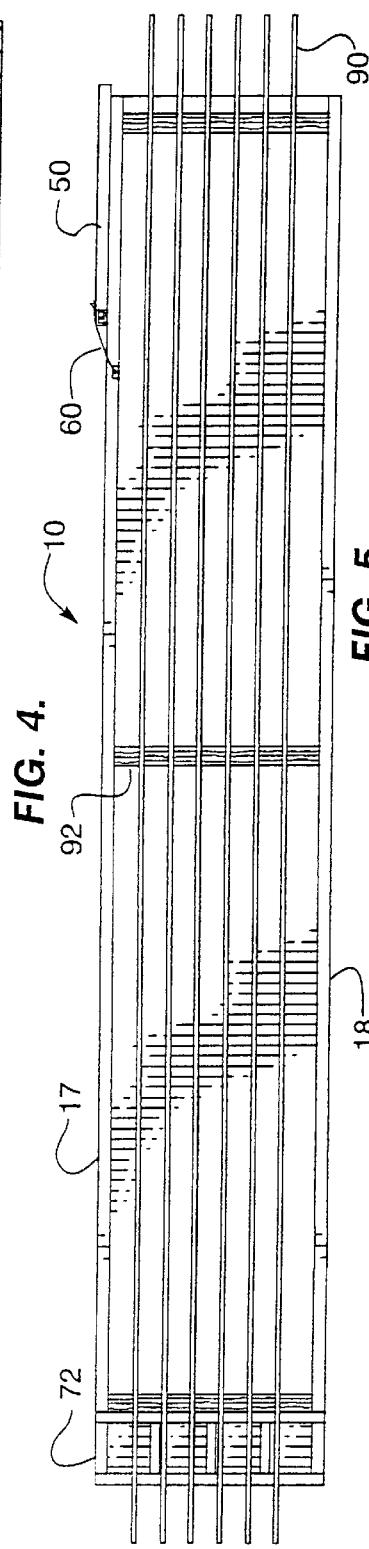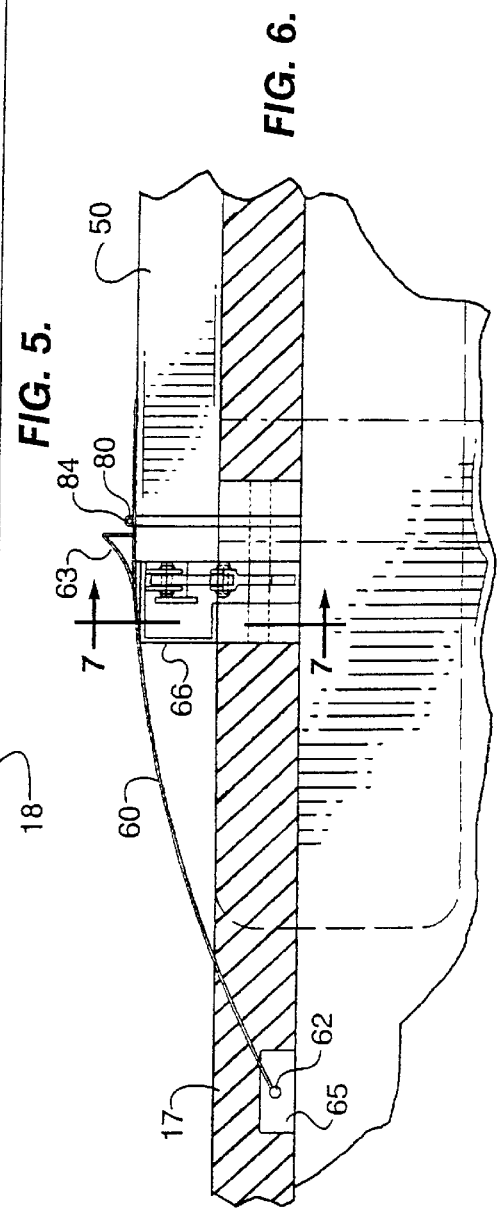

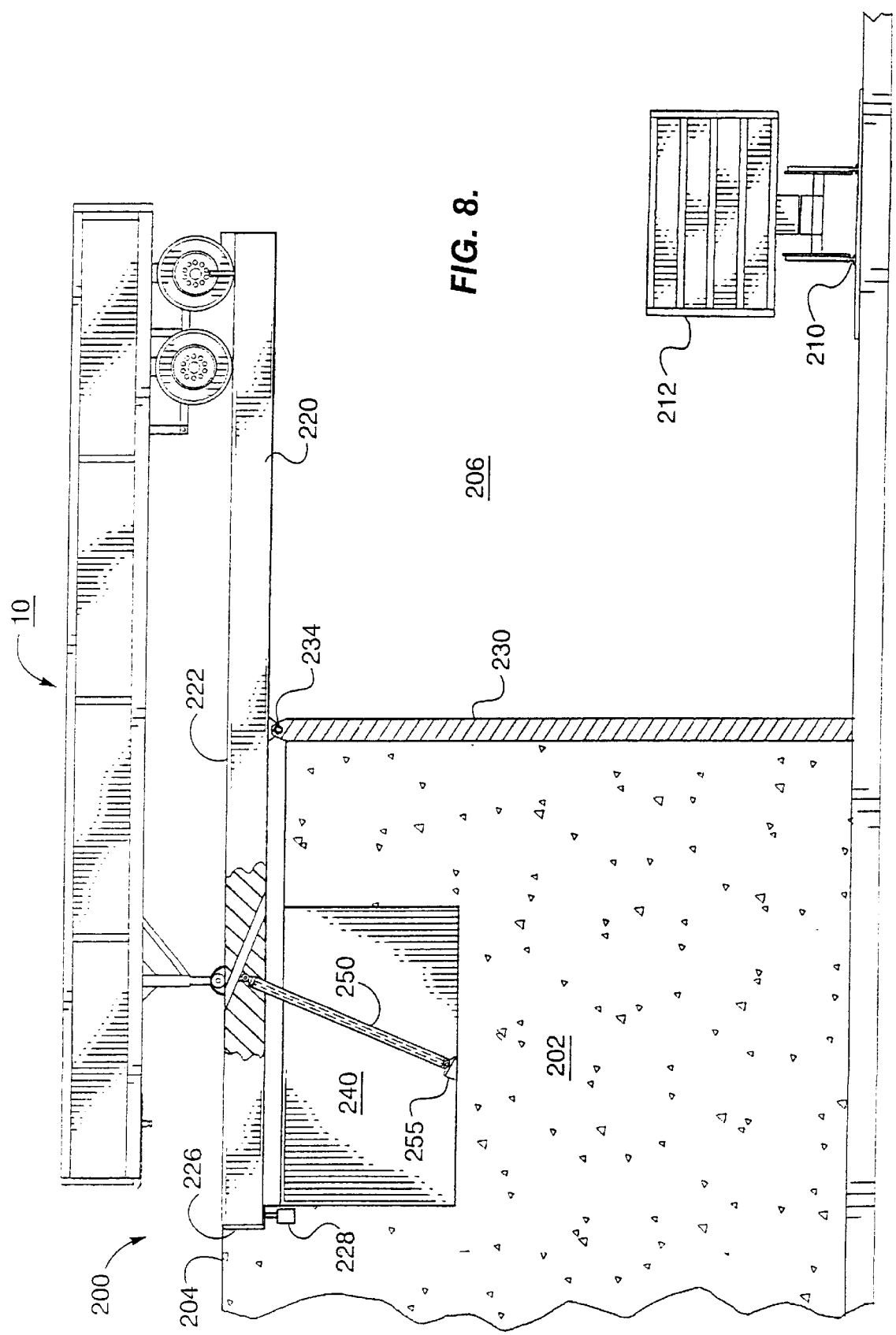

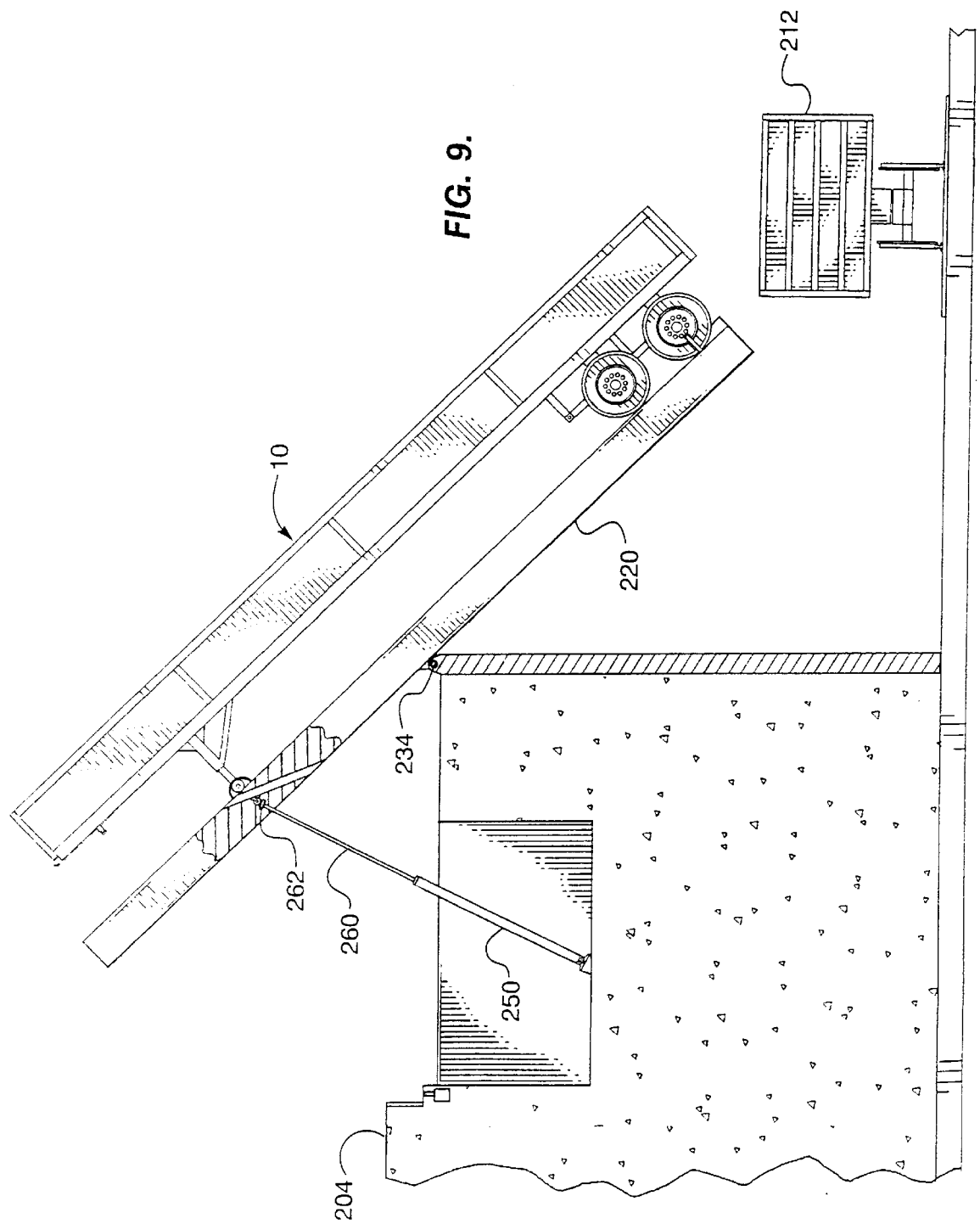

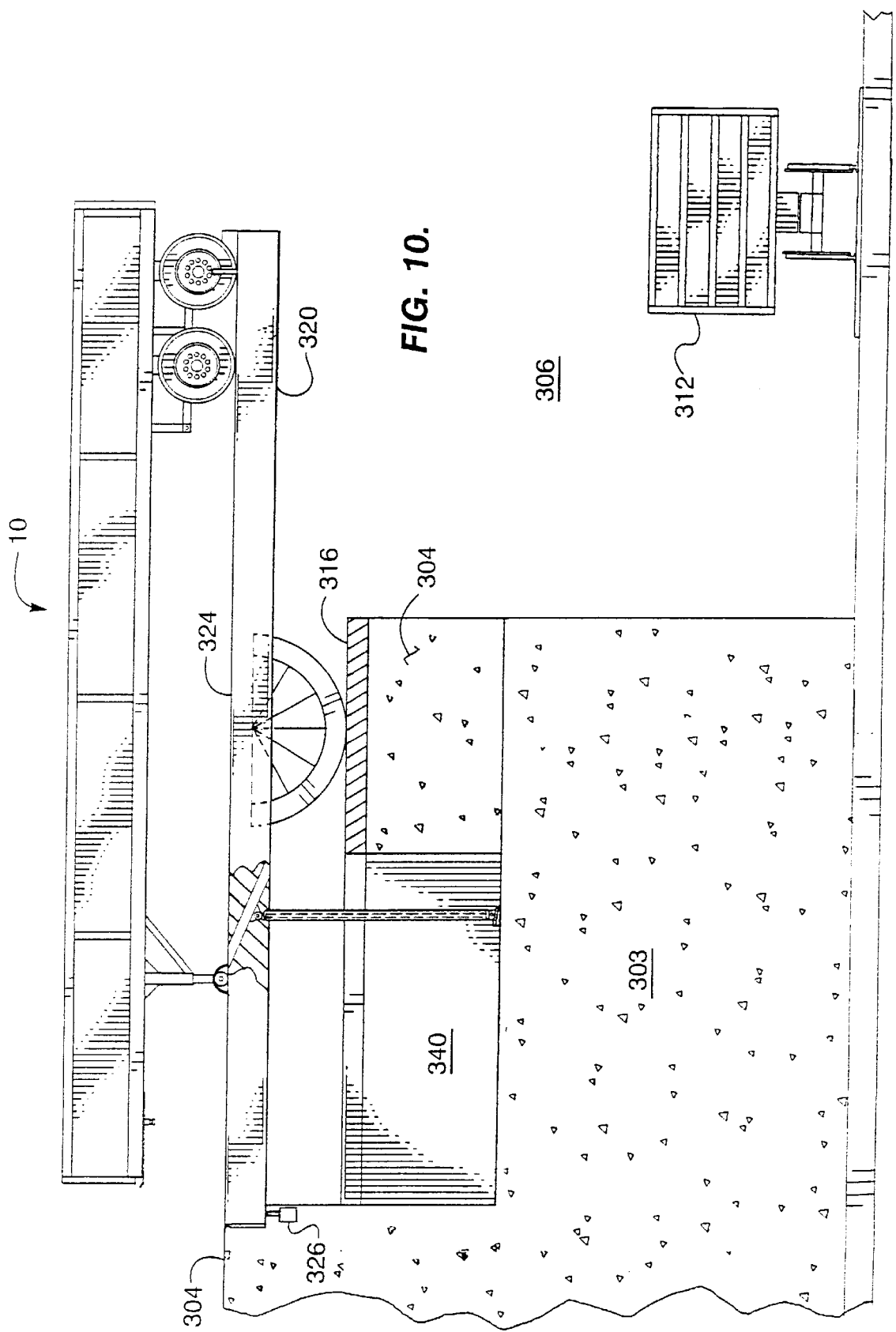

MATERIAL HANDLING TRAILER SYSTEM

CROSS-REFERENCE RELATED TO APPLICATION

This application is a division of Ser. No. 08/759,137 "MATERIAL HANDLING TRAILER SYSTEM" filed Dec. 2, 1996, now U.S. Pat. No. 6,027,297.

BACKGROUND OF THE INVENTION

The present invention relates to a material hauling and transportation system, and more particularly to a versatile, multiple-use trailer for hauling both long material as well as loose and bulk material, which trailer may be unloaded by a tiltable unloading platform.

Long materials such as rebar, steel specialty products, pipe and other materials are typically transported on long flatbed trailers. Sections of rebar are typically 50 to 60 feet long and flatbed trailers work well for transporting products of this type. However, the problem that arises is that long flatbed trailers are not well adapted for hauling other materials such as bulk material or scrap metal. For efficient and economic hauling, trailers must be capable of multiple use so that trailers can transport loads in both directions of travel and do not have to "deadhead" in one direction. Accordingly, if long trailers adapted for hauling items such as rebar from a steel mill or distribution facility are to be also used for hauling scrap material and loose or bulk material, such trailers have to be modified to accommodate loose material. Usually this modification involves attaching sideboards, about 4 feet high, to the opposite sides of the flatbed. Unloading of the materials such as scrap metal from conventional flatbeds is also complicated and normally unloading requires use of a crane and a magnet to pick up the load from the trailer and deposit it in a yard or at a job site.

Prior art tractor trailing dumping mechanisms are typified by U.S. Pat. No. 2,953,410, which shows a tractor drawn trailer in which the fifth wheel may be elevated by means of a hydraulically actuated lifting and lowering device.

U.S. Pat. No. 3,788,702 shows an improved system for handling the bulk material such as trash refuse. This patent provides a tractor design so that it is possible to lift a 35 foot long trailer and dump its contents safely.

Accordingly, there exists a need for improved trailer and hauling system which will accommodate long lengths of material and also allow the trailer to be used for hauling other materials such as scrap material, which trailer can be conveniently off-loaded.

The broad object of the present invention is to provide a multi-use trailer which may be pulled by a tractor for conveniently hauling both long material and loose material.

Another object of the present invention is to provide a versatile long bed trailer having a front gate and a rear gate which may be pivoted to an open position, along the side of the trailer and secured in place by an air safety wing to prevent the door from being inadvertently closed during travel.

Another object of the invention is to provide a long bed trailer which is light weight and requires less maintenance.

A specific object of the present invention is to provide a trailer suitable for hauling scrap materials to a steel facility and hauling on the return trip, long lengths of rebar.

It is the object of the present invention to provide a unique platform for dumping the contents of the trailer, which platform maintains a vertical dump line.

It is another object of the present invention to provide a long length trailer which may be dumped without requiring the complexity and expense of incorporating a dumping mechanism as part of the trailer.

BRIEF SUMMARY OF THE INVENTION

Basically, the present invention provides a multiple use trailer which trailer is elongated, having a deck and upstanding side walls. A dump gate is provided at the rear of the trailer, which dump gate may be pivoted about a vertical axis to an open position adjacent one side of the trailer, and safely retained in the open position by an aerodynamic locking safety wing. The trailer is also provided with a front gate which may be side or bottom opening. With the front and rear dump gates closed, the trailer may be used to haul loose material such as scrap material to a steel facility. When dumping the contents of the trailer, the rear end gate may be opened. Both the front and rear end gates may be placed in an open position for hauling long loads such as rebar which may extend beyond the front and rear end of the deck. Thus, rebar or other finished material may be hauled on a return trip from a steel facility, making efficient use of the trailer, as the trailer may be used in both directions of a trip. The trailer does not require modification such as placement of temporary side walls on the deck when handling loose material.

To keep the trailer light, a dumping mechanism is provided which is not part of the trailer but is part of the unloading site and includes an elevated platform on which the trailer is positioned. Suitable chocks and a locking device secure the trailer to the platform. The trailer and platform may be elevated by means of suitable hydraulic rams with the weight of the trailer assisting to pivot the platform. As the trailer and platform are rearwardly pivoted, the contents, such as scrap material, are discharged from the end along a constant dump line into a suitable receptacle such as a rail car. In one embodiment, the platform is mounted on a semi-circular fulcrum, which allows the platform to both rotate and also to laterally move to maintain a constant dump line. Conventional unloading equipment such as cranes and magnets may also be used to unload the trailer.

BRIEF DESCRIPTION OF THE DRAWINGS

The above and other objects and advantages of the present invention will be more fully appreciated and understood from the following description, claims and drawings in which:

FIG. 4 is a side view of the trailer of the present invention shown with the front gates open;

FIG. 5 is a top view of the trailer showing the trailer loaded with long material such as rebar and both the front and rear end gates open;

FIG. 6 is a detail view showing the dump gate in an open, locked position secured by the air safety wing;

FIG. 8 is a view showing the trailer on a dumping platform;

FIG. 9 is similar to FIG. 8, showing the dumping platform in a tilted, dumping position;

FIG. 10 shows the hauling trailer in connection with an alternate embodiment of unloading platform;

Turning now to the drawings, FIGS. 1 through 7A depict the trailer of the system of the present invention which is shown and is generally designated by the numeral 10 and has a body 16 having an elongated frame 12 which supports a planar of flat deck 14. Frame 12 may be constructed in a conventional manner and may be uni-body construction supported by longitudinally extending beams 15 and cross members extending at appropriate locations. The deck 14 may be a steel plate such as 1/8" to 1/4" plate welded to the frame or chassis 12. The body has opposite side walls 17 and 18 which extend the length of the trailer and may typically be about 3 to 6 feet high. Side walls 17 and 18 are also suitably reinforced at spaced-apart locations by members 20. A front gate 22 is located at the front of the trailer and extends between the opposite side walls. The front gate may be side opening or may, as shown in FIG. 1, pivot downwardly and horizontally at pivot 21 against the biasing force exerted by spring 24 which extends between the trailer body and the gate 22.

Figure 1:
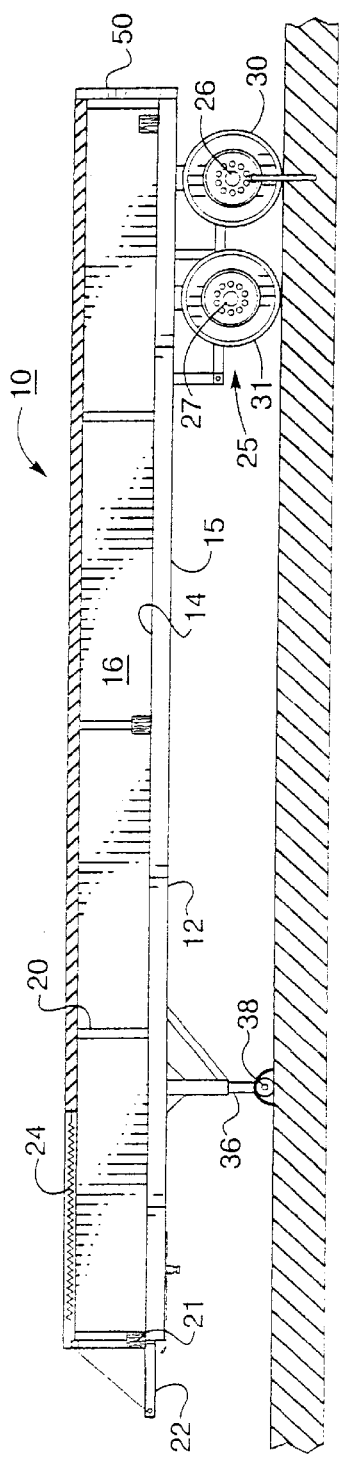
FIG. 1 is a side elevational view of a trailer according to the present invention shown with the front gate open.

The trailer is supported on a suitable suspension assembly 25 which, as shown, includes tandem dual axles 26 and 27 each supporting wheel assemblies 30 and 31, respectively. The wheel assemblies may be fixed or one or both of the wheel assemblies 30 and 31 may be sliding assemblies which may be longitudinally adjusted to accommodate the load.

A landing gear 36 having an extendable ground engaging foot 38 is disposed at a forward location and extending from the underside of the frame to support the trailer when the trailer is not secured to a tractor. The trailer may be coupled or secured to a tractor by kingpin 40 of conventional design.

Figure 2:
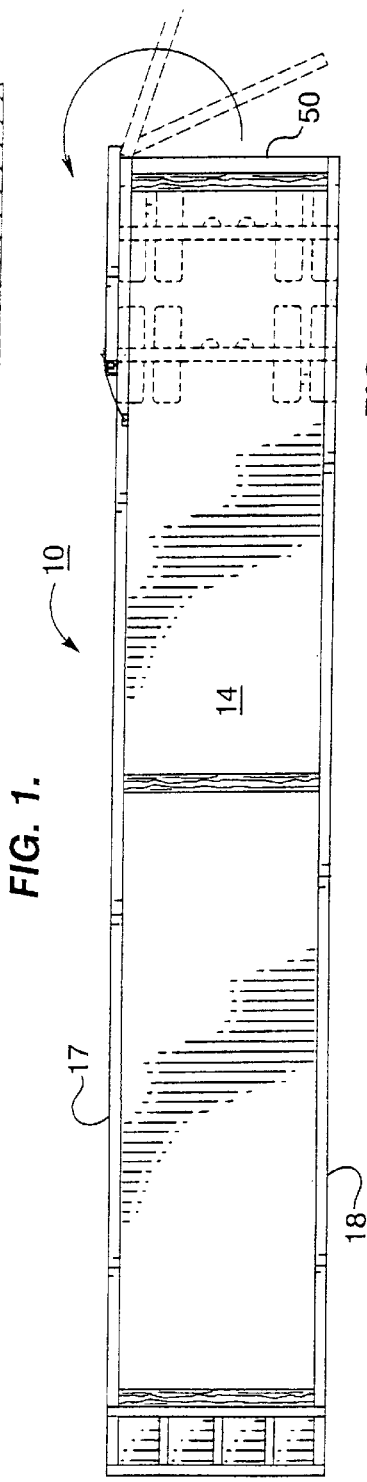
FIG. 2 is a top view of the trailer shown in FIG. 1 with both the front and rear dump gates being in an open position.
Figure 3:
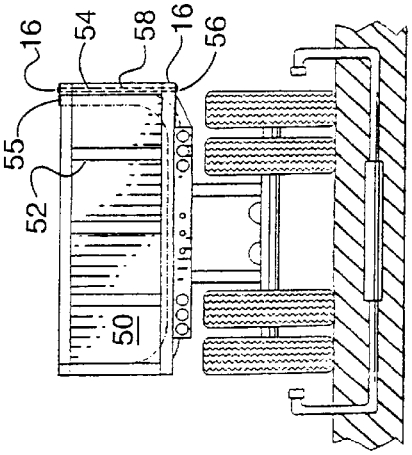
FIG. 3 is a rear view of the trailer with both the end gate closed and locked.

The rear end dump gate or door 50 comprises a generally rectangular fabricated suitable steel plate and reinforced by structural members 52, as best seen in FIGS. 2 and 3. The dump gate 50 is pivotally secured to the rear of side wall 17 by a hinge which consists of vertical hinge pins 54. Hinge plate 55 extends laterally from the top of the side wall 17 and hinge plate 56 extends laterally from the bottom of side wall 16. Hinge pin 54 extends between the hinge plates and through a vertical bore 58 in the edge of the end gate. The end gate is pivotal through a range of about 270° between the closed position shown in FIG. 2 in which the gate closes the end of the trailer, to an open position in which the gate will assume a position adjacent the outer surface of side wall 17, as seen in FIG. 5.

As best seen in FIGS. 5, 6, 7 and 7A, the trailer may be transported with the dump gate open to accommodate long loads. An air safety or deflector wing 60 is pivotally secured to the side wall 17 at pivot pin 62 disposed forwardly of the end of the dump gate when the dump gate is in the full open position. The air wing is of a height corresponding approximately to the height of the dump gate. The air wing 60 has a generally planar surface which at its distal end forms a curved section 63, which acts as a wind deflector to deflect air flow outwardly when the trailer is moving in a forward direction. In the transport position, a portion of the wing 60 overlaps the end dump gate 50 and secures it in a full open position. A vertical channel 66 is welded to the inner side of air wing 60 to secure it in a stable position spaced from side wall 17 when the end gate is open. The air wing, in addition to securing the door in an open position so long loads can be accommodated, also increases the aerodynamic efficiency of the trailer by deflecting air flow outwardly and not allowing the airflow to be directed between the side of the trailer 16 and the dump gate.

Figure 7:
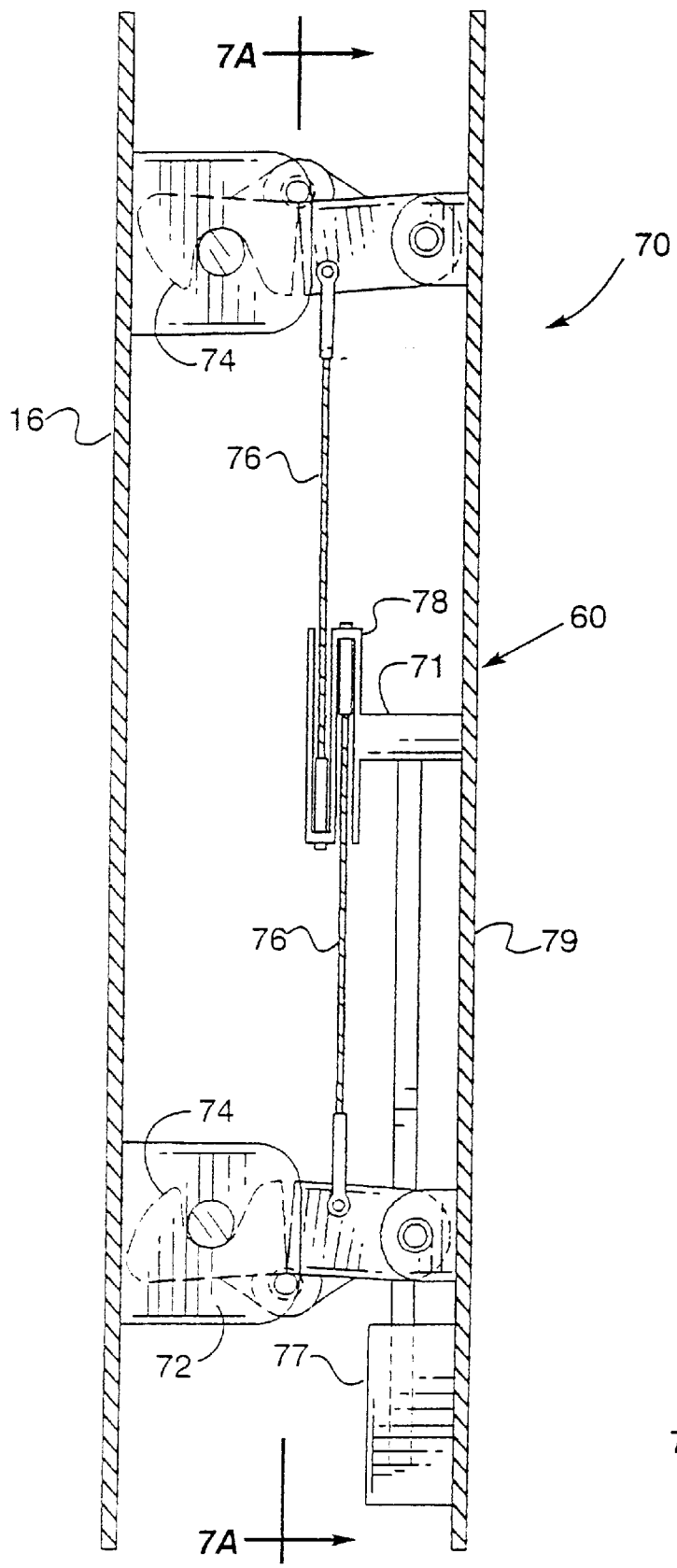
FIG. 7 is a sectional view taken along line 7—7 of FIG. 6.
Figure 7A:
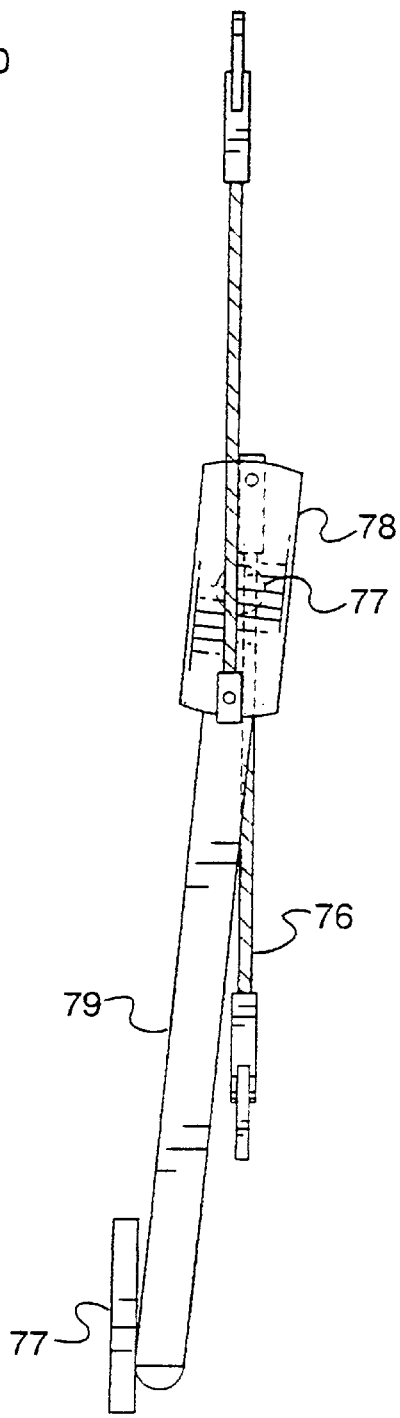
FIG. 7A is a sectional view taken along line 7A—7A of FIG. 7.

The air wing is locked in the closed position as shown in FIGS. 7 and 7A by means of latch 70 which consists of a pair of latch pins 72 mounted at spaced-apart locations on the exterior of side wall 17. Latch plates 74 are pivotally secured to the interior of wing 60 and each are secured by rods 76 to a bar 78. Bar 78 is rotatable on shaft 71 by means of handle 79. Rotation of handle 79 to the unlocked position will allow latch plates 74 to oppositely pivot to an open position. When open, wing 60 can be pivoted outwardly to allow gate 50 to assume a position adjacent side wall 17 as seen in FIG. 6. The wing 60 may then be returned to a closed position overlying a portion of the gate and locked by means of handle 79 which will bring the latch plates into locking engagement with the latch pins 72 as seen in FIG. 7. Handle 79 engages stop 77 when closed. Gate 50 may also be retained by an additional lock which is shown as a manually insertable pin 80 extending vertically into strap 82 which is welded to upper edge of side wall 17 which tab has a receiving bore 84.

The design of the trailer allows both loose material such as scrap metal, grain, gravel and the like, to be hauled and for loads of this type, gate 50 is in a closed position to prevent material from being inadvertently discharged from the rear of the trailer. Since the trailer has side walls, it is not necessary for the operator to attach temporary side walls as is necessary with most conventional flatbeds when used for hauling long loads. A temporary tarp can be used to protect loads, if necessary. Thus, the trailer may be used, as for example, to haul loose scrap metal to a steel facility such as a steel mill or a steel collection and distribution location. Once the trailer has been dumped, it can be loaded with finished steel products such as long lengths of rebar or steel pipe.

Long loads, such as rebar and pipe, are accommodated by opening the end gate to the full open position shown in FIG. 5. In this position, both gates 50 and 22 may be open to allow easy loading and unloading of such loads and will also allow loads to project beyond both ends of the trailer as permitted by local highway regulations.

FIG. 5 shows the trailer 10 loaded with lengths of rebar 90 projecting a permitted distance beyond both ends of the trailer. The long rebar sections are supported on traverse wooden blocks 92 at spaced intervals in the trailer. The blocks provide frictional resistance to movement of the load. Because of the substantial length of the trailer, standard dump construction, which involves the use of on-board hydraulics would not be practical or safe. Accordingly, in order to facilitate dumping and also to maintain minimum weight, the dumping mechanism is not integrated into the trailer as with a conventional end dump trailer.

Referring to FIGS. 8 and 9, a dumping platform is shown which is generally designated by the numeral 200. The platform includes an elevated loading area or unloading area which is shown as a concrete abutment 202 having an upper roadway surface 204. Adjacent to the abutment is a receiving area 206 into which materials from the trailer 10 are to be dumped. The receiving area 206 may, for example, include railroad tracks 210 onto which a rail car 212 can be positioned for receipt of material off-loaded from trailer 10. Platform 220 has an upper surface 222 which aligns with the roadway surface 204. The platform has a forward end which, in the horizontal position, seats in a recess 226 in the abutment and is lockably in this position by locking pin 228, which is engageable in the platform. The pin may be manually or hydraulically actuated. The platform is of sufficient length so that it projects outward of the abutment so that its outer end is positioned above the desired discharge location, in this case above rail tracks 210. The platform suitably fabricated from steel or other high strength materials suitably reinforced.

The platform 220 is pivotal at an intermediate location about the upper end of vertical side wall 230 at pivot pin 234. The abutment 202 defines a pit area 240 below the inner end of the platform. The pit area 240 accommodates necessary equipment for pivoting the platform to the dump position, shown in FIG. 9 and returning it to the position shown in FIG. 8.

A hydraulic ram 250 is shown having its head end pivotally affixed to a mounting pad 255 within the pit area. The extendable rod 260 is pivotally secured to the underside of the platform 220 at pivot connection 262. It will be seen that when the hydraulic ram is pressurized, the rod 260 will extend elevating the platform to the position shown in FIG. 9 in which the platform is positioned approximately 450 with respect to the roadway surface 204. The pivot point 234 is located at an intermediate location along the platform so that the weight of the trailer and its contents assist in pivoting the platform. In the dump position, all loose material in the trailer will, due to the effect of gravity, be discharged from the end of the trailer into the area 206 or into a rail car 212.

Figure 11:
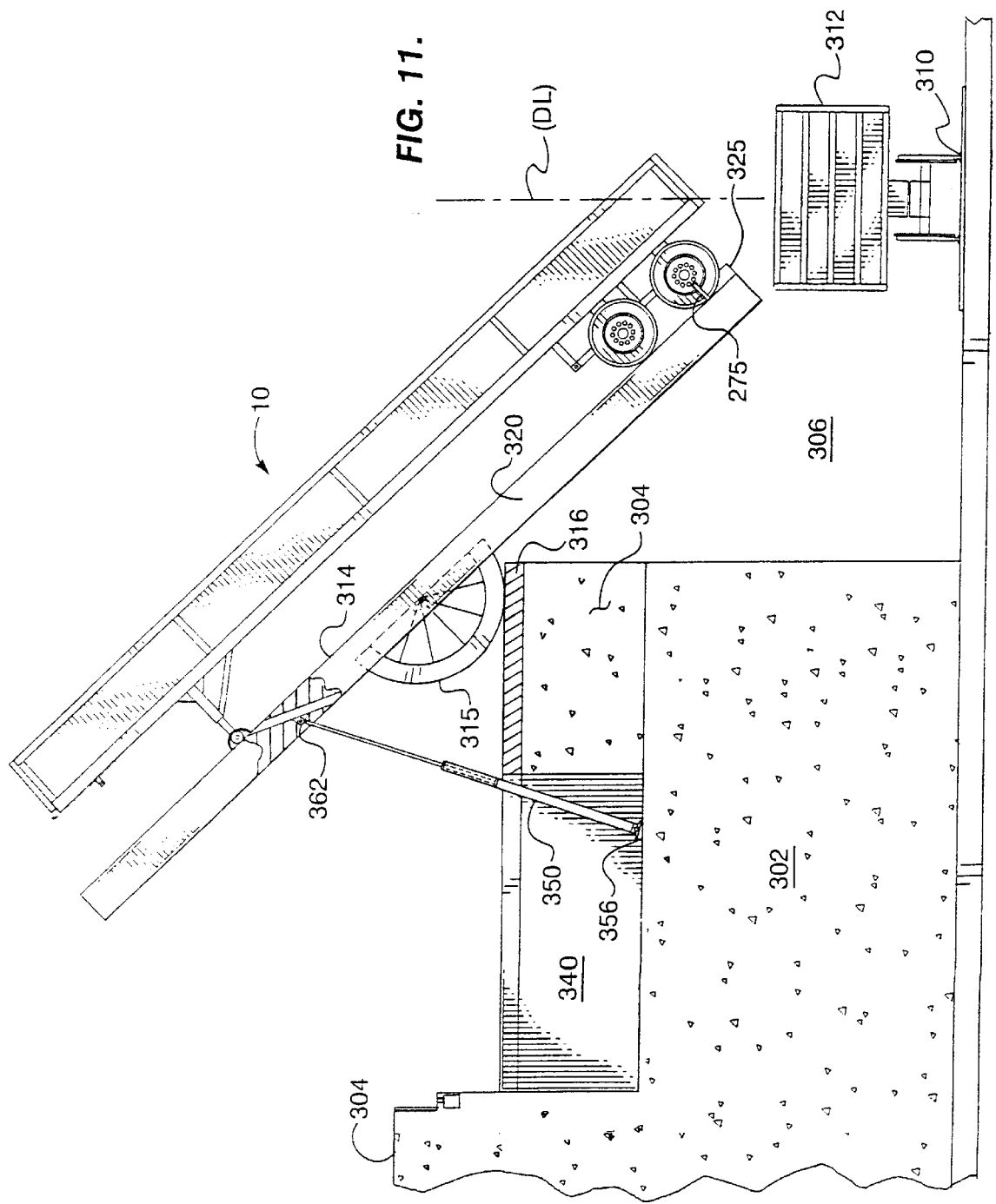
FIG. 11 shows the unloading platform of FIG. 10 in a tilted dump position unloading into a rail car.
Figure 12:
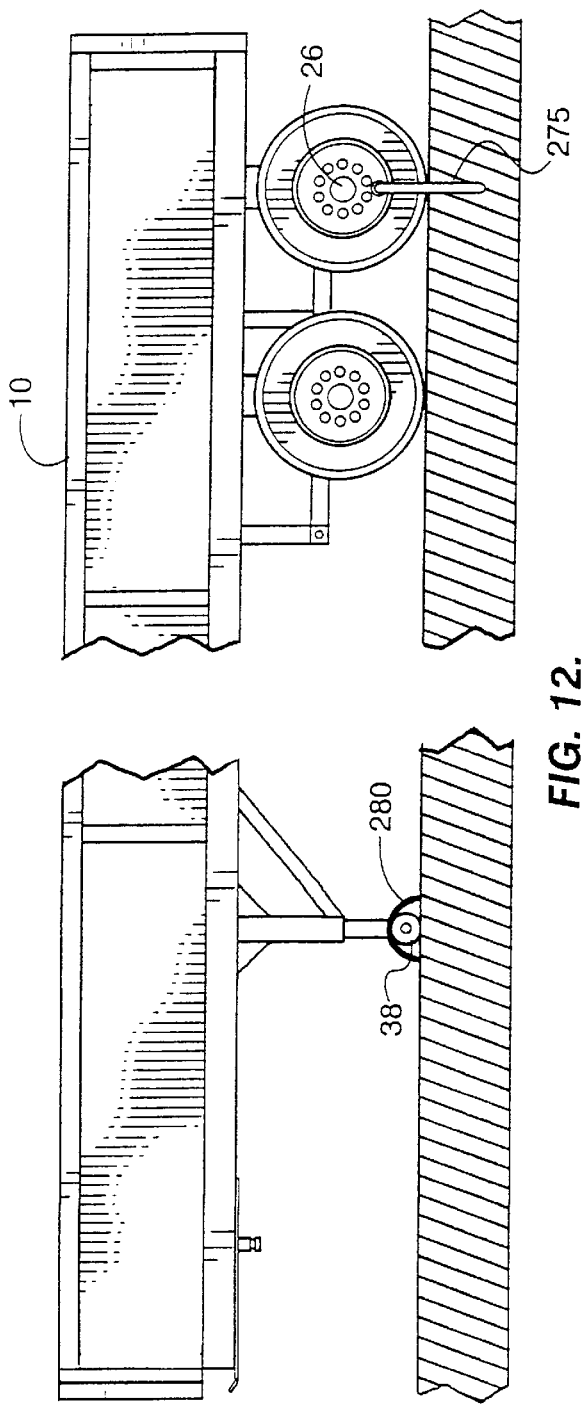
FIG. 12 illustrates a locking mechanism in connection with a trailer.
Figure 13:
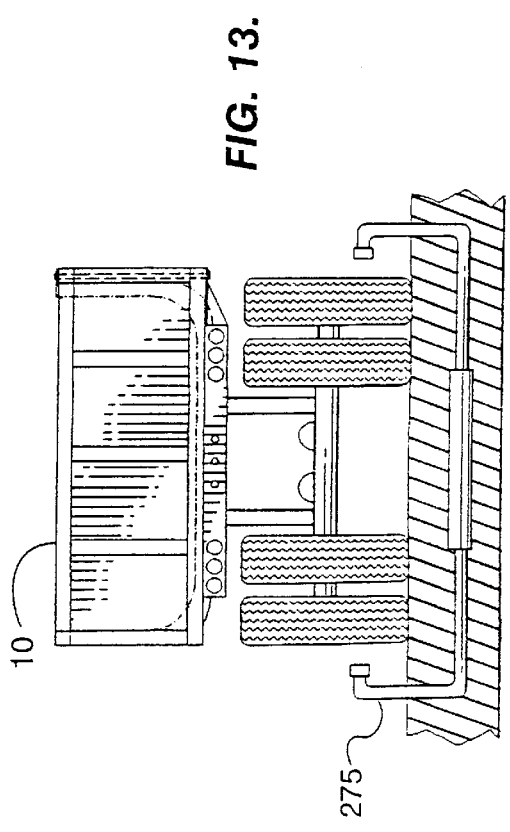
FIG. 13 is a rear view of the trailer and locking mechanism of FIG. 12.

As seen in FIGS. 12 and 13, the trailer is maintained in position on the platform by means of rear hydraulic locking mechanisms 275 which will releasably engage the opposite rear wheels 26. A retainer or chock 280 engages the foot 38 of the landing gear. FIGS. 10 and 11 illustrate an alternate embodiment of the dumping mechanism of the present invention designated by the numeral 300. The advantage of the dumping mechanism shown in FIGS. 10 and 11 is that the platform both tilts and moves laterally to maintain a constant dump line. The embodiments of FIGS. 8, 9, 10 and 11 are stable and require less energy to operate. In the embodiment of FIGS. 10 and 11, the platform 320 is mounted on suitable abutment 302 which has a roadway surface 304 onto which the trailer to be dumped may be backed into position by a tractor trailer. The abutment includes a pit area 340 adjacent a dumping area 306. The dumping area includes rail tracks 310 onto which rail car 312 may be moved for purposes of receiving the off-loaded material from the trailer. The forward end of the abutment 302 has a section 309 having an upper bearing surface 316 which is parallel to the road surface 304, but displaced at an elevation below the road surface 304. Platform 320 is constructed as described with reference to FIG. 9 and has a generally planar upper surface 314 with chocks 325 at the outer end and a locking mechanism 275 which is engageable with the rear wheels to maintain the trailer in a stable position during dumping. The platform 320 is tilted by means of hydraulic ram 350 which is secured within the pit area 340 at mounting pad 355. The rod end of the ram is pivotally secured to the platform at pivotal connection 362. Platform 320 further includes a generally arcuate fulcrum 375 which extends from the underside of the platform at an intermediate location. The fulcrum rests on bearing surface 316. In the normal position shown in FIG. 10, the platform is locked in a horizontal position by means of a hydraulic or pneumatic actuator bolt 326 so that the upper surface 324 of the platform 320 is co-planar with the roadway surface 304. The inner end of the platform rests in a recess 328 in the loading and unloading abutment.

When the trailer is in the position shown in FIG. 10, with the rear wheels engaging or abutting the chocks 325 and the trailer locked in position by means of a locking device 275 engaging the rear wheels, the hydraulic ram 350 may then be pressurized. As the ram is pressurized, the mounting of the ram allows it to pivot rearwardly as it extends. The platform will be rotated to the inclined dumping or off-loading position shown in FIG. 11. As this occurs, the platform will also be moved rightwardly from the position shown in FIG. 10, which is permitted by the relative sliding action of the arcuate surface of the fulcrum 375 on the bearing surface 316. This motion maintains a constant dump line "DL" as shown in FIG. 11 so that off-loaded material will be properly discharged into the rail car 312. The weight of the trailer and its contents assist in causing one trailer to pivot to the dump position. Once empty, the hydraulic ram is retracted which, along with the weight of the trailer, will rotate the platform to a horizontal position in which it may then be locked.

From the foregoing, it will be seen that the present invention provides a multiple use long trailer design which will handle both long material and loose scrap material. The trailer can do the job of a flatbed trailer, a dry van trailer and an end dump trailer. The trailer has openable gates at both the front and rear ends. The trailer is light weight since the dumping mechanism is external. The unique dumping platform utilizes the weight of the rear of the trailer to help rotate the platform between horizontal and dumping positions and return position. The system provides substantial advantages and ease of operation and requires less energy and the platform is better stabilized. With the present invention, dumping material can be dumped from the platform into a stockpile or onto a conveyor or rail car for transportation to another location.

While the principles of the invention have been made clear in the illustrative embodiments set forth above, it will be obvious to those skilled in the art to make various modifications to the structure, arrangement, proportion, elements, materials and components used in the practice of the invention. To the extent that these various modifications do not depart from the spirit and scope of the appended claims, they are intended to be encompassed therein.

I claim:

1. A multiple-use trailer for use with a tractor comprising:
  (a) an open bed having front and rear ends and supported for transport on a wheel and axle assembly and having a deck and upstanding side walls;
  (b) an openable front gate at a front end of the bed;
  (c) an openable rear gate at a rear end of the bed, said rear gate having an open position adjacent the outer side of one of said side walls;
  (d) an air wing positionable against said rear gate in said open position whereby said trailer may be used with the gates closed for hauling or may be used with the gates open for hauling long material extending beyond the ends of the bed.

2. The multiple-use trailer of claim 1 wherein said air wing is pivotally secured to said side wall and has an air deflector section to direct air flow outwardly from said side wall.

3. The multiple-use trailer of claim 2 further including latch means for releasably securing said air wing adjacent the side wall.

4. The multiple-use trailer of claim 3 wherein said front end gate is biased to a closed position.

5. The multiple use trailer of claim 3 wherein said latch means comprise a pair of latch pins spaced apart on said side walls and latch plates pivotally secured to the air wing, said latch pins engageable with said latch plate in a locked position and having an unlocked position.

6. The multiple use trailer of claim 5 including actuator means for selectively pivoting said latch plates to an unlocked position.

7. The multiple use trailer of claim 5 including a spacer interposed between said air wing and said side wall.

* * * * *